(12) United States Patent
Kubota et al.

(10) Patent No.: US 9,944,310 B2
(45) Date of Patent: Apr. 17, 2018

(54) STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Tatsuro Kubota, Shiki-gun (JP); Yuji Takahashi, Obu-shi (JP); Tomonori Sugiura, Yamatokoriyama-shi (JP); Shoji Ishimura, Kashihara-shi (JP); Shigeru Hoshino, Toyota-shi (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 15/059,901

(22) Filed: Mar. 3, 2016

(65) Prior Publication Data

US 2016/0264168 A1 Sep. 15, 2016

(30) Foreign Application Priority Data

Mar. 9, 2015 (JP) ................................. 2015-046048

(51) Int. Cl.
*B62D 1/19* (2006.01)
*B62D 1/185* (2006.01)

(52) U.S. Cl.
CPC ............. *B62D 1/192* (2013.01); *B62D 1/185* (2013.01); *B62D 1/195* (2013.01)

(58) Field of Classification Search
CPC ........ B62D 1/192; B62D 1/184; B62D 1/195; B62D 1/185
See application file for complete search history.

(56) References Cited

FOREIGN PATENT DOCUMENTS

| EP | 2450254 A1 | 5/2012 |
| JP | S63-43978 U | 3/1988 |
| JP | 2002-059849 A | 2/2002 |
| JP | 2009-107506 A | 5/2009 |

OTHER PUBLICATIONS

Jul. 18, 2016 Extended Search Report issued in European Patent Application No. 16158686.2.

*Primary Examiner* — Karen Beck
(74) *Attorney, Agent, or Firm* — Oliff PLC (57) ABSTRACT

A column jacket includes an outer jacket and an inner jacket that are slidable relative to each other in the axial direction for telescopic adjustment. The inner jacket has an outer peripheral surface fitted to an inner peripheral surface of the outer jacket. A base end of an engaging member is fixed to the inner jacket. The inner peripheral surface of the outer jacket includes a guide groove, and a stopper provided at an end of the guide groove. The stopper restricts disconnection of the inner jacket from the outer jacket when being engaged with the engaging member. The engaging member is engaged with the guide groove, and the guide groove guides axial movement of the inner jacket via the engaging member. The guide groove has a bottom portion that faces a distal end of the engaging member.

4 Claims, 8 Drawing Sheets

STEERING APPARATUS

INCORPORATION BY REFERENCE

The disclosure of Japanese Patent Application No. 2015-046048 filed on Mar. 9, 2015 including the specification, drawings and abstract is incorporated herein by reference in its entirety.

BACKGROUND OF THE INVENTION

1. Field of the Invention

The present invention relates to a steering apparatus.

2. Description of Related Art

With regard to an extendable steering column apparatus, there has been proposed a technique in which a guide block fixedly supported by an inner column is inserted in an elongate hole (guide slot) extending in the axial direction of an outer column, so that the relative rotation between the outer column and the inner column is restricted while the relative movement therebetween in the axial direction is allowed (see, for example, Japanese Patent Application. Publication No. 2009-107506 (JP 2009-107506 A)). Further, with regard to a telescopic steering apparatus, there has been proposed a technique in which a pin fixed to an inner tube is fitted in an elongate hole extending in the axial direction of an outer tube, so that the telescopic motion limit position of a steering column is specified and the relative rotation between the outer tube and the inner tube is restricted (see, for example, Japanese Utility Model Application Publication No. 63-43978 (JP 63-43978 U)).

SUMMARY OF THE INVENTION

When a pin or the like functioning as a stopper is disconnected or breaks due to an impact or the like in the event of a secondary collision, the function of preventing disconnection of an inner tube from an outer tube may fail to be fulfilled. The present invention provides a steering apparatus configured to reliably prevent disconnection of an inner jacket from an outer jacket.

An aspect of the invention relates to a steering apparatus including steering shaft, a column jacket, and an engaging member. A steering member is connected to the steering shaft. The steering shaft is extendable in an axial direction. The steering shaft is rotatably supported by the column jacket. The column jacket is extendable in the axial direction. The column jacket includes an outer jacket and an inner jacket that are fitted to each other so as to be slidable relative to each other in the axial direction for telescopic adjustment. The engaging member has a base end fixed to the inner jacket. An inner peripheral surface of the outer jacket includes a guide groove and a stopper. The engaging member is engaged with the guide groove. The guide groove extends in the axial direction. The guide groove is configured to guide axial movement of the inner jacket via the engaging member while rotation of the inner jacket is restricted due to engagement of the engaging member with the guide groove. The stopper is provided at an end of the guide groove. The stopper is configured to restrict disconnection of the inner jacket from the outer jacket when being engaged with the engaging member. The guide groove has a bottom portion that faces a distal end of the engaging member.

Because the guide groove of the inner peripheral surface of the outer jacket has the bottom portion, disengagement of the engaging member from the inner jacket is restricted by the bottom portion of the guide groove. Thus, it is possible to reliably prevent disconnection of the inner jacket from the outer jacket by engaging the engaging member with the stopper provided at the end of the guide groove. Further, improvement in the rigidity of the outer jacket makes it possible to provide the steering apparatus having high rigidity.

In the above aspect, the outer jacket may include an opening through which the engaging member is allowed to be passed. Further, the outer jacket may be configured such that, when the column jacket is in a first most contracted state at the time of telescopic adjustment, the opening is located below the engaging member in the axial direction. Further, the outer jacket may be configured such that, when the column jacket is in a second most contracted state at the time of a secondary collision, the opening is located above the engaging member in the axial direction.

When the column jacket is in the first most contracted state at the time of telescopic adjustment, the opening of the outer jacket is located at a position below the engaging member in the axial direction. Thus, it is possible to suppress reduction in the rigidity of the outer jacket due to the opening. When the column jacket is in the second most contracted state at the time of a secondary collision, the opening of the outer jacket is located at a position above the engaging member in the axial direction. Thus, it is possible to suppress reduction in the rigidity of the outer jacket due to the opening at the time of the secondary collision.

In the above aspect, the engaging member may be a conductive member, the engaging member may be provided so as to be integral with a conductive elastic member that makes slide contact with the outer jacket, the outer jacket may be connected to a vehicle-body-side member such that electric conduction is allowed between the outer jacket and the vehicle-body-side member, and electric conduction may be allowed between the inner jacket and the outer jacket via the engaging member and the conductive elastic member.

Electric conduction between the inner jacket and the outer jacket that is connected to the vehicle-body-side member in an electrically-conductive manner is ensured via the conductive engaging member and the conductive elastic member. This makes it possible to reduce the occurrence of radio noise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
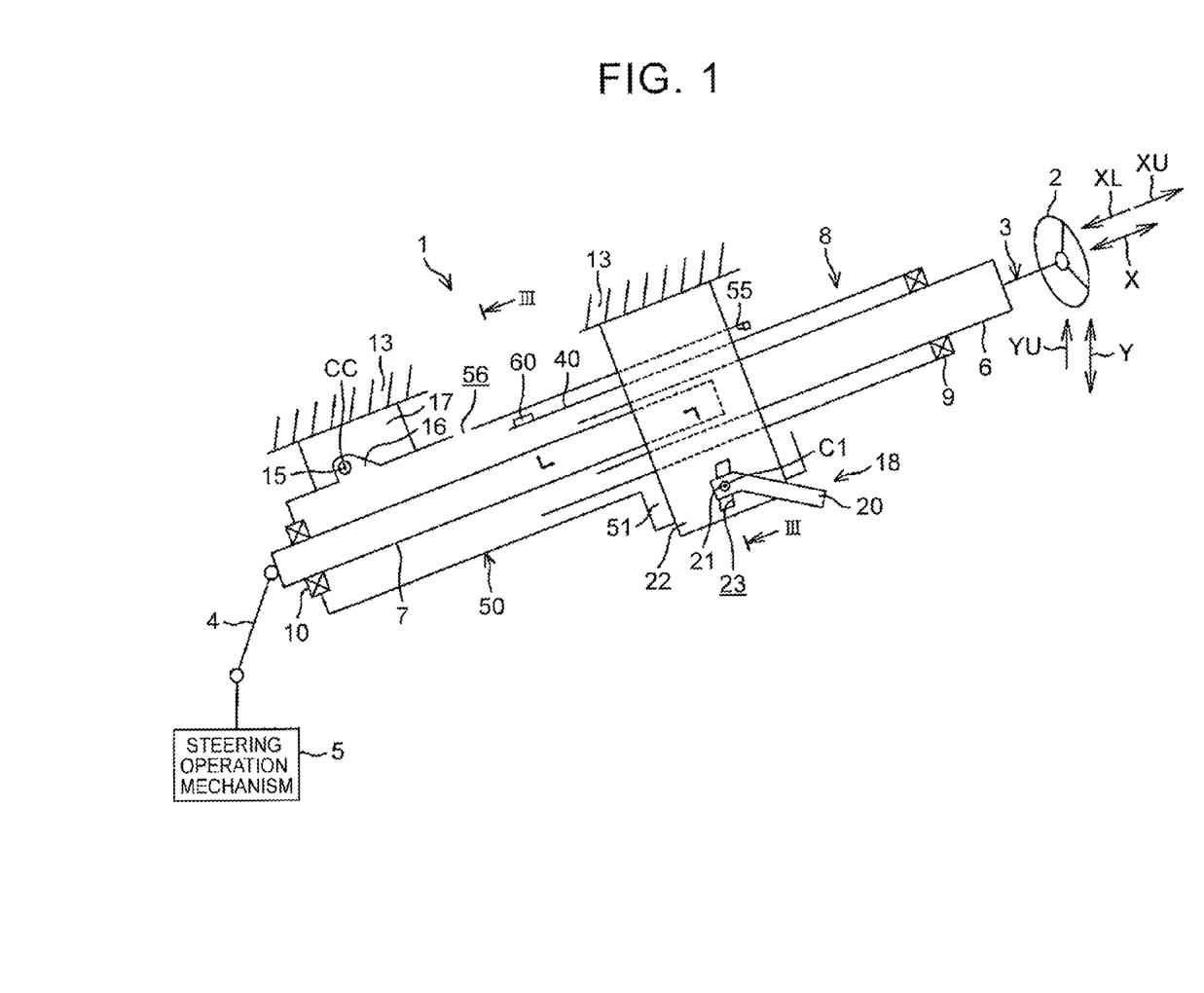
FIG. 1 is a partially broken schematic side view illustrating the schematic configuration of a steering apparatus in a first embodiment of the present invention.

Hereinafter, a first embodiment of the present invention will be described with reference to the attached drawings. FIG. 1 is a partially broken schematic side view illustrating the schematic configuration of a steering apparatus 1 in the first embodiment of the present invention. As illustrated in FIG. 1, the steering apparatus 1 includes: a steering shaft 3 having a first end (an axially upper end) to which a steering member 2, such as a steering wheel, is connected; and a steering operation mechanism 5 connected to the steering shaft 3 via an intermediate shaft 4 or the like.

The steering operation mechanism 5 is, for example, a rack-and-pinion mechanism that steers steered wheels (not illustrated) in association with steering of the steering member 2. The rotation of the steering member 2 is transmitted to the steering operation mechanism 5 via the steering shaft 3, the intermediate shaft 4, and so on. Further, the rotation transmitted to the steering operation mechanism 5 is converted into an axial movement of a rack shaft (not illustrated). Consequently, the steered wheels are steered.

The steering shaft 3 includes a tubular upper shaft 6 and a lower shaft 7 that are fitted to each other by spline-fitting or serration-fitting, for example, so as to be slidable relative to each other. The steering member 2 is connected to a first end of the upper shaft 6. Further, the steering shaft 3 is extendable in an axial direction X. The steering apparatus 1 includes a hollow column jacket 8 by which the steering shaft 3 is rotatably supported. The steering shaft 3 is passed through the column jacket 8, so as to be rotatably supported by the column jacket 8 via a plurality of bearings 9, 10.

The column jacket 8 includes a tubular inner jacket 40, such as an upper jacket, and a tubular outer jacket 50, such as a lower jacket. The inner jacket 40 and the outer jacket 50 are fitted to each other so as to be slidable relative to each other. The column jacket 8 is extendable in the axial direction X. The inner jacket 40 disposed on the upper side is connected via the bearing 9 to the upper shaft 6 so as to be movable together with the upper shaft 6 in the axial direction X. The outer jacket 50 disposed on the lower side supports the lower shaft 7 via the bearing 10 such that the lower shaft 7 is rotatable.

Figure 3:
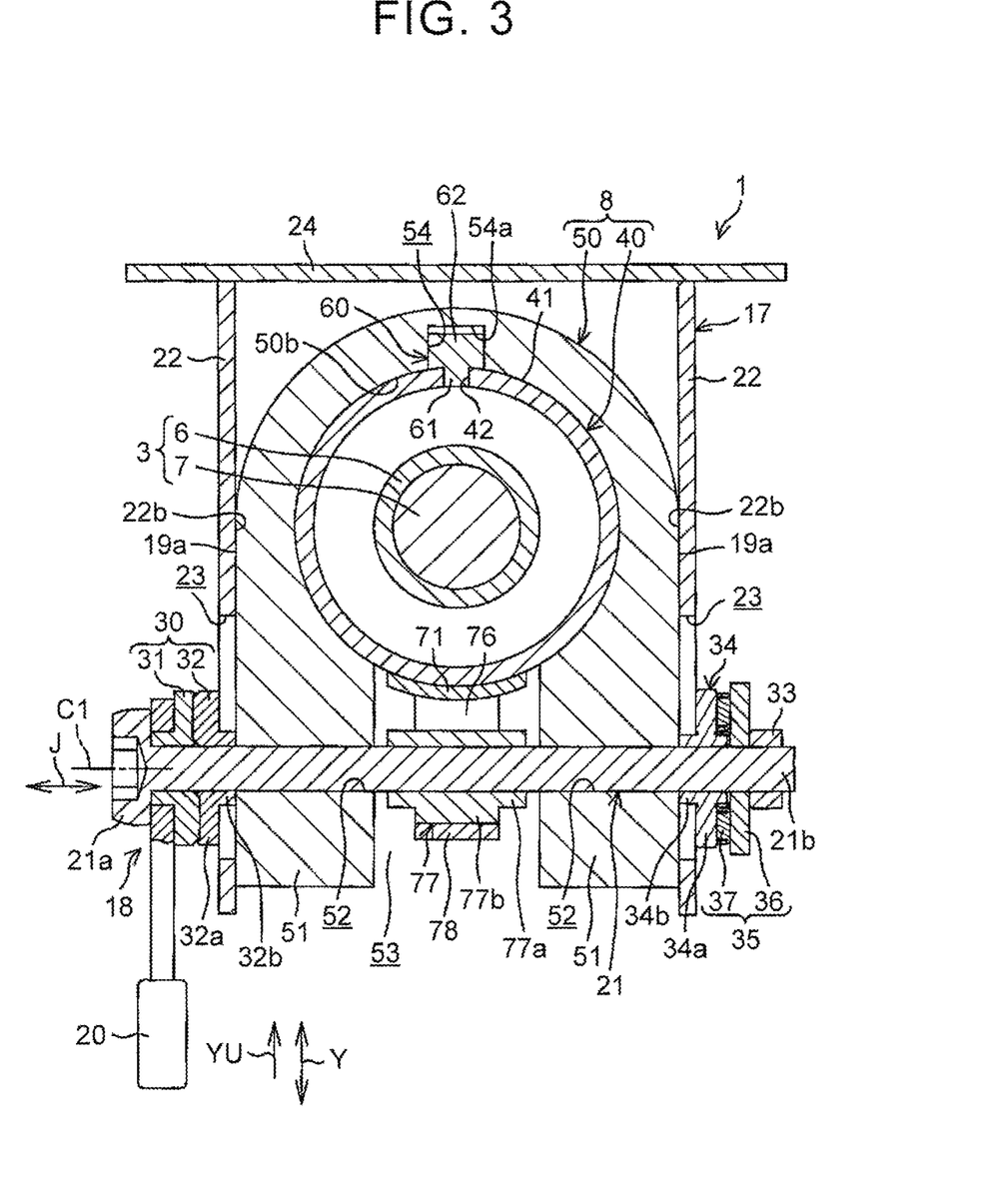
FIG. 3 is a sectional view of a main portion of the steering apparatus in the first embodiment, FIG. 3 corresponding to a sectional view taken along the line III-III in FIG. 1.

As illustrated in FIG. 3, which is a sectional view taken along the line III-III in FIG. 1, the inner jacket 40 has an outer peripheral surface 41 fitted to an inner peripheral surface 50b of the outer jacket 50 so as to be slidable in the axial direction X (direction perpendicular to the sheet on which FIG. 3 is drawn). An engaging member 60 is fixed to the inner jacket 40. The engaging member 60 has a base end 61 and a distal end 62. The base end 61 is fixedly press-fitted in a fixing hole 42 that passes through the inner jacket 40 in its radial direction from the outer peripheral surface 41. The engaging member 60 may be made of resin or metal.

When the engaging member 60 is fitted in a guide groove 54, the rotation of the inner jacket 40 relative to the outer jacket 50 is restricted. The guide groove 54 has a function of guiding the movement of the inner jacket 40 in the axial direction X via the engaging member 60. The guide groove 54 has a bottom portion 54a that faces the distal end 62 of the engaging member 60. With this configuration, the engaging member 60 is inhibited from falling out of the outer jacket 50.

Figure 5:
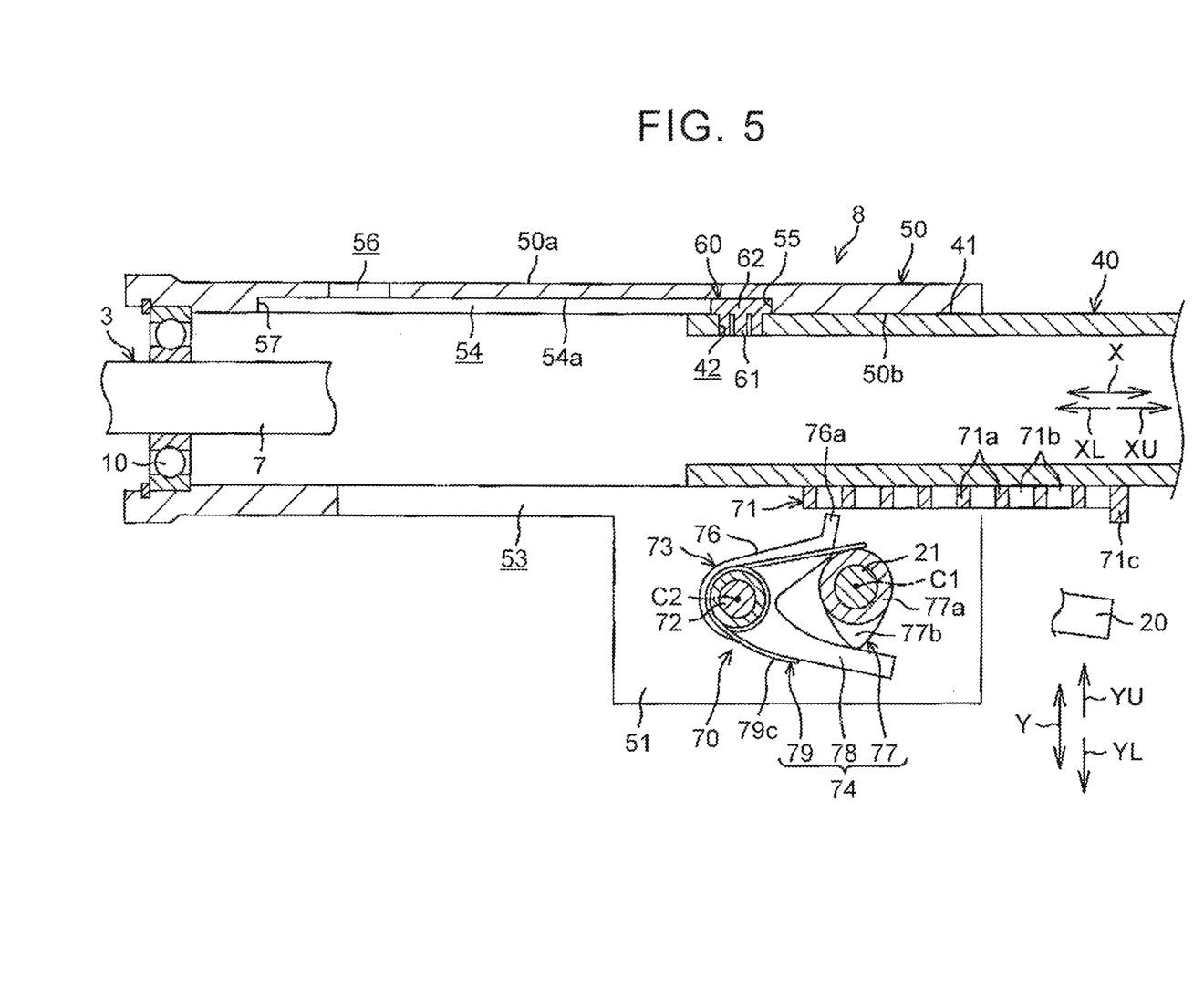
FIG. 5 is a sectional view of the main portion of the steering apparatus in the first embodiment as viewed from another angle, FIG. 5 illustrating the state where an inner jacket is placed at the extension-side end of the telescopic stroke range at the time of telescopic adjustment.

As illustrated in FIG. 5, the inner peripheral surface 50b of the outer jacket 50 has an extension-side stopper 55 constituted by a stepped portion provided at the upper end of the guide groove 54 in the axial direction X, and a bump stopper 57 constituted by a stepped portion provided at the lower end of the guide groove 54 in the axial direction X. At the time of telescopic adjustment, the extension-side stopper 55 is engaged with the engaging member 60 when the inner jacket 40 is placed at the extension-side end of the telescopic stroke range, thereby performing a function of inhibiting the inner jacket 40 from being disconnected from (from falling out of) the outer jacket 50. The extension-side stopper 55 defines the extension-side end of the telescopic stroke range for the inner jacket 40.

Figure 8:
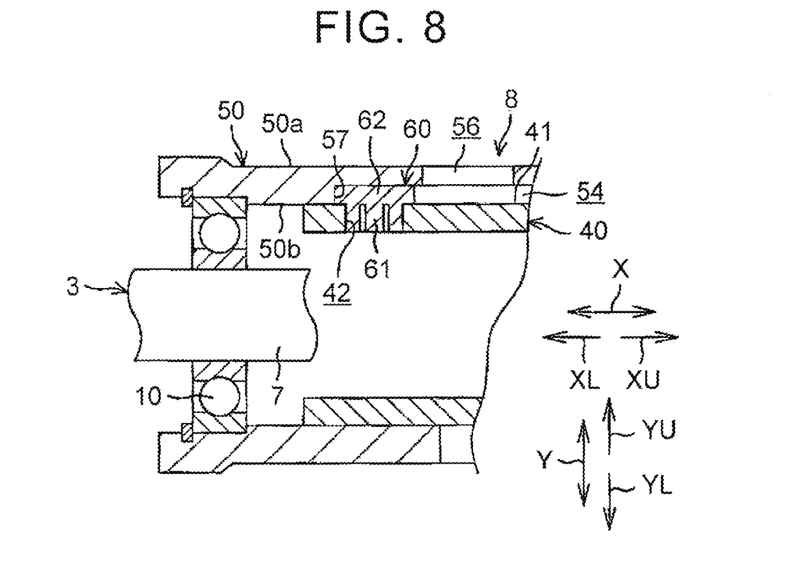
FIG. 8 is a sectional view of the main portion of the steering apparatus at the time when a column jacket is placed in a second most contracted state at the time of a secondary collision, in the first embodiment.

As illustrated in FIG. 8, in the event of a secondary collision, the bump stopper 57 comes into contact with the engaging member 60, thereby defining the contraction-side stroke end for the inner jacket 40 at the time of the secondary collision. Referring again to FIG. 1, the steering apparatus 1 includes: a fixed bracket 14 fixed to a vehicle body 13; a tilt central shaft 15 supported by the fixed bracket 14; and a column bracket 16 fixed to an outer peripheral surface of the outer jacket 50 and rotatably supported by the tilt central shaft 15. The column jacket 8 and the steering shaft 3 are pivotable (tiltable) in a tilt direction Y using a tilt center CC as a fulcrum. The tilt center CC is a central axis of the tilt central shaft 15.

When the steering shaft 3 and the column jacket 8 are pivoted (tilted) about the tilt center CC, the position of the steering member 2 is adjusted (so-called tilt adjustment). When the steering shaft 3 and the column jacket 8 are extended or contracted in the axial direction X, the position of the steering member 2 is adjusted (so-called telescopic adjustment). The steering apparatus 1 includes a bracket 17 fixed to the vehicle body 13, and a fastening mechanism 18 that achieves a tilt lock and a telescopic lock by clamping a pair of fastened portions 51 (corresponding to clamped plates). The fastened portions 51 are made of the same material as that of the outer jacket 50 so as to be integral with the upper portion of the outer jacket 50 in the axial direction X.

Figure 2:
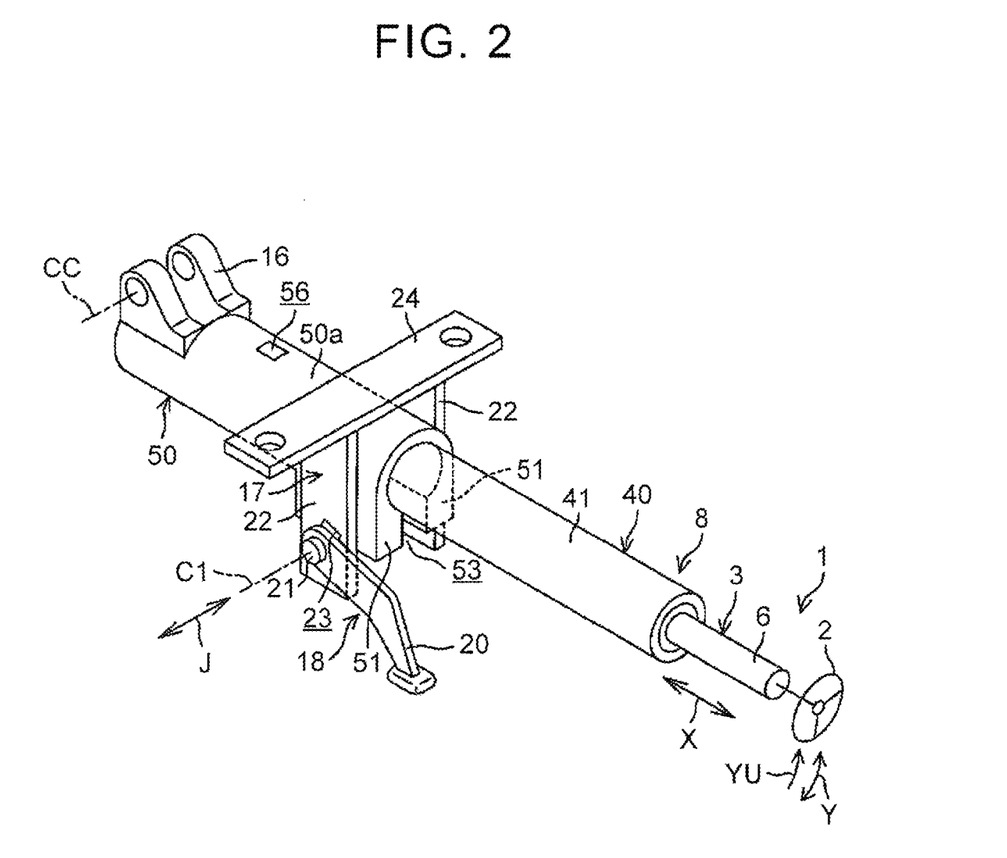
FIG. 2 is a schematic perspective view of the steering apparatus in the first embodiment.

As illustrated in FIG. 1 and FIG. 2 that is a schematic perspective view, the fastening mechanism 18 includes an operating lever 20 as an operating member rotated by a driver, and a fastening shaft 21 that is rotatable together with the operating lever 20 in an integrated manner. A central axis C1 of the fastening shaft 21 coincides with the center of rotation of the operating lever 20. As illustrated in FIG. 5, the outer jacket 50 defines a slit 53 extending downward from the upper end in the axial direction X. As illustrated in FIG. 2, the fastened portions 51 are disposed on the respective sides of the slit 53. By clamping the fastened portions 51, the diameter of the outer jacket 50 is reduced elastically.

The fastening shaft 21 is passed through tilt elongate holes 23 respectively provided in a pair of side plates 22 (only one side plate 22 is illustrated in FIG. 1) of the bracket 17 so as to extend in the tilt direction Y. Referring to FIG. 2, the fastening mechanism 18 achieves a tilt lock by fastening the bracket 17 to the fastened portions 51 of the outer jacket 50 via the fastening shaft 21. Further, the fastening mechanism 18 achieves a telescopic lock in the following manner. The inner jacket 40 is clamped immovably in the axial direction X by the outer jacket 50 that is reduced in diameter by clamping the fastened portions 51 of the outer jacket 50. In this way, the position of the steering member 2 is fixed with respect to the vehicle body 13 (see FIG. 1).

As illustrated in FIG. 3, the bracket 17 includes a mounting plate 24 attached to the vehicle body 13, and the side plates 22 extending downward in the tilt direction Y from the respective ends of the mounting plate 24. The fastened portions 51 of the outer jacket 50 are disposed between the side plates 22, and are each in the form of a plate that conforms to an inner surface 22b of a corresponding one of the side plates 22. The inner surface 22b of each of the side plates 22 faces an outer surface 51b of a corresponding one of the fastened portions 51.

Each of the fastened portions 51 of the outer jacket 50 has a fastening shaft passing hole 52, which is a round hole through which the fastening shaft 21 is passed. At the time of tilt adjustment, the fastening shaft 21, the outer jacket 50, the inner jacket 40, and the steering shaft 3 move together with each other in the tilt direction Y. The fastening shaft 21 is a bolt passed through the tilt elongate holes 23 of the side plates 22 of the bracket 17 and the fastening shaft passing holes 52 of the fastened portions 51 of the outer jacket 50. A large-diameter head 21a provided at a first end of the fastening shaft 21 is fixed so as to be rotatable together with the operating lever 20 in an integrated manner.

The fastening mechanism 18 further includes a force conversion mechanism 30 that is disposed between the head 21a of the fastening shaft 21 and one of the side plates 22. The force conversion mechanism 30 converts the operation torque generated by operating the operating lever 20 into an axial force (fastening force for fastening the side plates 22) of the fastening shaft 21. The force conversion mechanism 30 includes a rotatable cam 31 and a clamping member 32. The rotatable cam 31 is connected to the operating lever 20 so as to be rotatable together with the operating lever 20 in an integrated manner. The movement of the rotatable cam 31 in a fastening shaft direction J relative to the fastening shaft 21 is restricted. The clamping member 32 is a non-rotatable cam that achieves cam engagement with the rotatable cam 31 to fasten the one of the side plates 22.

The fastening mechanism 18 further includes a nut 33 screwed to a threaded portion 21b of a second end of the fastening shaft 21, a clamping member 34 that fastens the other one of the side plates 22, and an intervening member 35 disposed between the clamping member 34 and the nut 33. The intervening member 35 includes: a washer 36 disposed between the nut 33 and the clamping member 34; and a needle roller bearing 37 disposed between the washer 36 and the clamping member 34.

The clamping member 34 and the intervening member 35 are disposed between the nut 33 and the other one of the side plates 22 of the bracket 17. The rotatable cam 31, the clamping member 32 (non-rotatable cam), the clamping member 34, and the intervening member 35 are supported on an outer peripheral surface of the fastening shaft 21. The clamping member 32 (non-rotatable cam) and the clamping member 34 respectively have clamping plate portions 32a, 34a that fasten the corresponding side plates 22, and boss portions 32b, 34b fitted to the corresponding tilt elongate holes 23. The rotations of the clamping members 32, 34 are restricted when the boss portions 32b, 34b are engaged in the corresponding tilt elongate holes 23.

The clamping member 32 (non-rotatable cam) and the clamping member 34 are supported on the fastening shaft 21 so as to be movable in the fastening shaft direction J, which is the central axis direction of the fastening shaft 21. Along with the rotation of the operating lever 20 in the locking direction, the rotatable cam 31 rotates relative to the clamping member 32 (non-rotatable cam). Consequently, the clamping member 32 is moved in the fastening shaft direction J, so that the pair of side plates 22 of the bracket 17 is clamped and fastened between the clamping plate portions 32a, 34a of the clamping members 32, 34.

Thus, each of the side plates 22 of the bracket 17 fastens a corresponding one of the fastened portions 51 of the outer jacket 50. As a result, the movement of the outer jacket 50 in the tilt direction Y is restricted, so that a tilt lock is achieved. Further, when the fastened portions 51 are fastened, the outer jacket 50 is elastically reduced in diameter to fasten the inner jacket 40. Consequently, the movement of the inner jacket 40 in the axial direction X is restricted, so that a telescopic lock is achieved.

Figure 4:
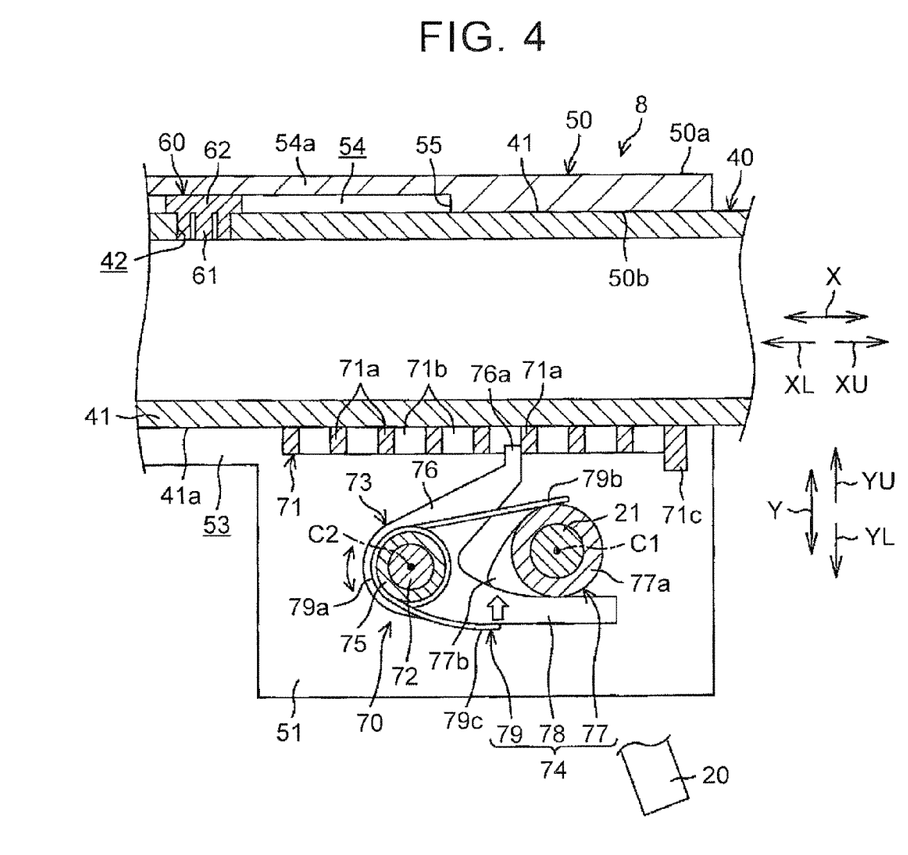
FIG. 4 is a sectional view of the main portion of the steering apparatus in the first embodiment, FIG. 4 illustrating the locked state of a tooth lock mechanism.

As illustrated in FIG. 4, the steering apparatus 1 includes a tooth lock mechanism 70 to increase the force of retaining a telescopic lock. The tooth lock mechanism 70 includes an engaged teeth formation member 71 fixed to the outer peripheral surface 41 of the inner jacket 40, an engaging tooth formation member 73 rotatably supported by the pair of fastened portions 51 via a support shaft 72, and a linkage mechanism 74 that links the rotation of the engaging tooth formation member 73 with the rotation of the fastening shaft 21 (i.e., that causes the engaging tooth formation member 73 to rotate as the fastening shaft 21 rotates).

Although not illustrated, the axial ends of the support shaft 72 are supported by the fastened portions 51, and the engaged teeth formation member 71 is supported by the inner jacket 40 in an intermediate region in the axial direction of the support shaft 72. The engaged teeth formation member 71 has a plurality of engaged teeth 71a arranged at prescribed intervals in the axial direction X. The engaged teeth 71a of the engaged teeth formation member 71 may be formed, for example, by forming a plurality of grooves 71b in an elongate plate at prescribed intervals such that the grooves 71b pass through the elongate plate. In this way, the engaged teeth 71a are provided between the grooves 71b.

The engaging tooth formation member 73 includes a boss portion 75 that surrounds an outer peripheral surface of the support shaft 72, and an engaging tooth formation arm 76 that projects so as to extend from an outer peripheral surface of the boss portion 75 and that has a distal end provided with an engaging tooth 76a engageable with any one of the engaged teeth 71a. An engaging projection 71c is provided at the upper end of the engaged teeth formation member 71 in the axial direction X. When the inner jacket 40 is placed at the contraction-side stroke end of the telescopic stroke range, the engaging projection 71c comes into contact with the engaging tooth 76a of the engaging tooth formation member 73. Thus, the contraction-side stroke end of the telescopic stroke range for the inner jacket 40 is defined. That is, the engaging tooth 76a functions as a contraction-side stopper that defines the contraction-side stroke end of the telescopic stroke range for the inner jacket 40.

The support shaft 72 includes a to-be-broken portion (not illustrated) that breaks due to an impact of a secondary collision that occurs in a locked state where any one of the engaged teeth 71a and the engaging tooth 76a are engaged with each other. Thus, an impact absorption load is generated due to the breakage of the to-be-broken portion in the event of a secondary collision. The breakage of the to-be-broken portion allows the movement (impact absorption movement) of the inner jacket 40 toward an axially lower side XL in the axial direction X. The linkage mechanism 74 includes: a cam member 77 connected to the fastening shaft 21 so as to be rotatable together with the fastening shaft 21 in an integrated manner; a cam follower arm 78 provided so as to be rotatable together with the engaging tooth formation member 73 in an integrated manner and driven by the cam member 77; and a biasing member 79 that rotatively biases the engaging tooth formation member 73 via the cam follower arm 78 in such a direction that the engaging tooth 76a is engaged with any one of the engaged teeth 71a.

The cam member 77 includes a boss portion 77a fitted to the outer peripheral surface of the fastening shaft 21 so as to be rotatable together with the fastening shaft 21 in an integrated manner; and a cam projection 77b projecting radially outwardly from the boss portion 77a. The biasing member 79 is, for example, a torsion spring. That is, the biasing member 79 includes: a coil portion 79a that surrounds the boss portion 75 of the engaging tooth formation member 73; a first engagement portion 79b that extends from the coil portion 79a so as to be engaged with an outer peripheral surface of the boss portion 77a of the cam member 77; and a second engagement portion 79c that is engaged with the cam follower arm 78.

The biasing member 79 rotatively biases the engaging tooth formation member 73 in the counterclockwise direction in FIG. 4 (indicated by a hollow arrow in FIG. 4). When the operating lever 20 and the fastening shaft 21 are rotated in the locking direction (clockwise direction in FIG. 5) about the central axis C1 of the fastening shaft 21 from the unlocking state illustrated in FIG. 5, the cam projection 77b allows the counterclockwise rotation of the cam follower arm 78 about a central axis C2 of the support shaft 72. Thus, due to the action of the biasing member 79, the engaging tooth formation member 73 rotates counterclockwise, so that the engaging tooth 76a is engaged with any one of the engaged teeth 71a as illustrated in FIG. 4. In this way, a tooth lock is achieved.

Figure 7:
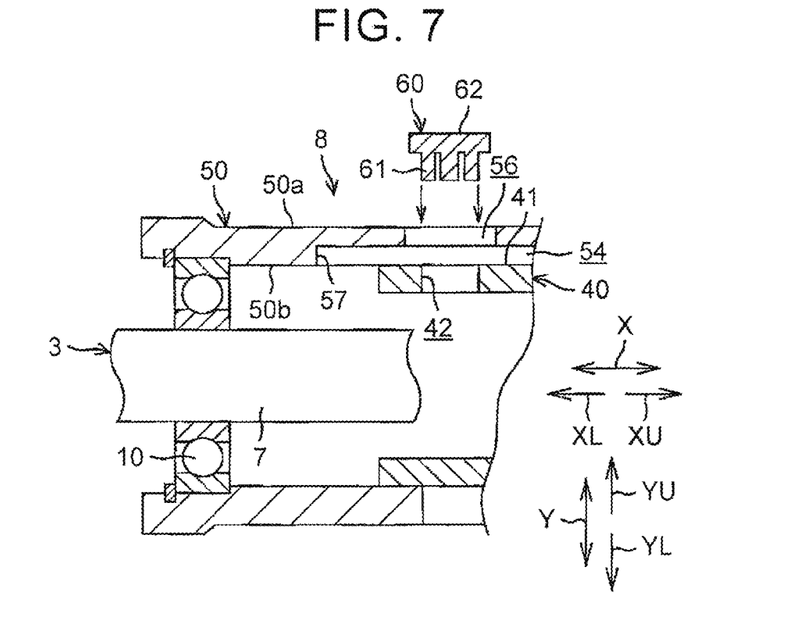
FIG. 7 is a schematic sectional view illustrating an assembly step of incorporating an engaging member in the first embodiment.

When the operating lever 20 is rotated in the unlocking direction from the locked state illustrated in FIG. 4, the cam projection 77b rotates the engaging tooth formation member 73 clockwise about the central axis C2 via the cam follower arm 78 against the biasing member 79, as illustrated in FIG. 5. Thus, the engaging tooth 76a is disengaged from any one of the engaged teeth 71a, so that the tooth lock is cancelled. As illustrated in FIG. 7, the outer jacket 50 has an opening 56 through which the engaging member 60 is passed at the time of assembly. The opening 56 passes through the outer jacket 50 from the outer peripheral surface 50a to the inner peripheral surface 50b of the outer jacket 50. During assembly, in the state where the position of the opening 56 of the outer jacket 50 is aligned with the position of the fixing hole 42 of the inner jacket 40, the engaging member 60 is press-fitted into the fixing hole 42 of the inner jacket 40 through the opening 56.

Figure 6:
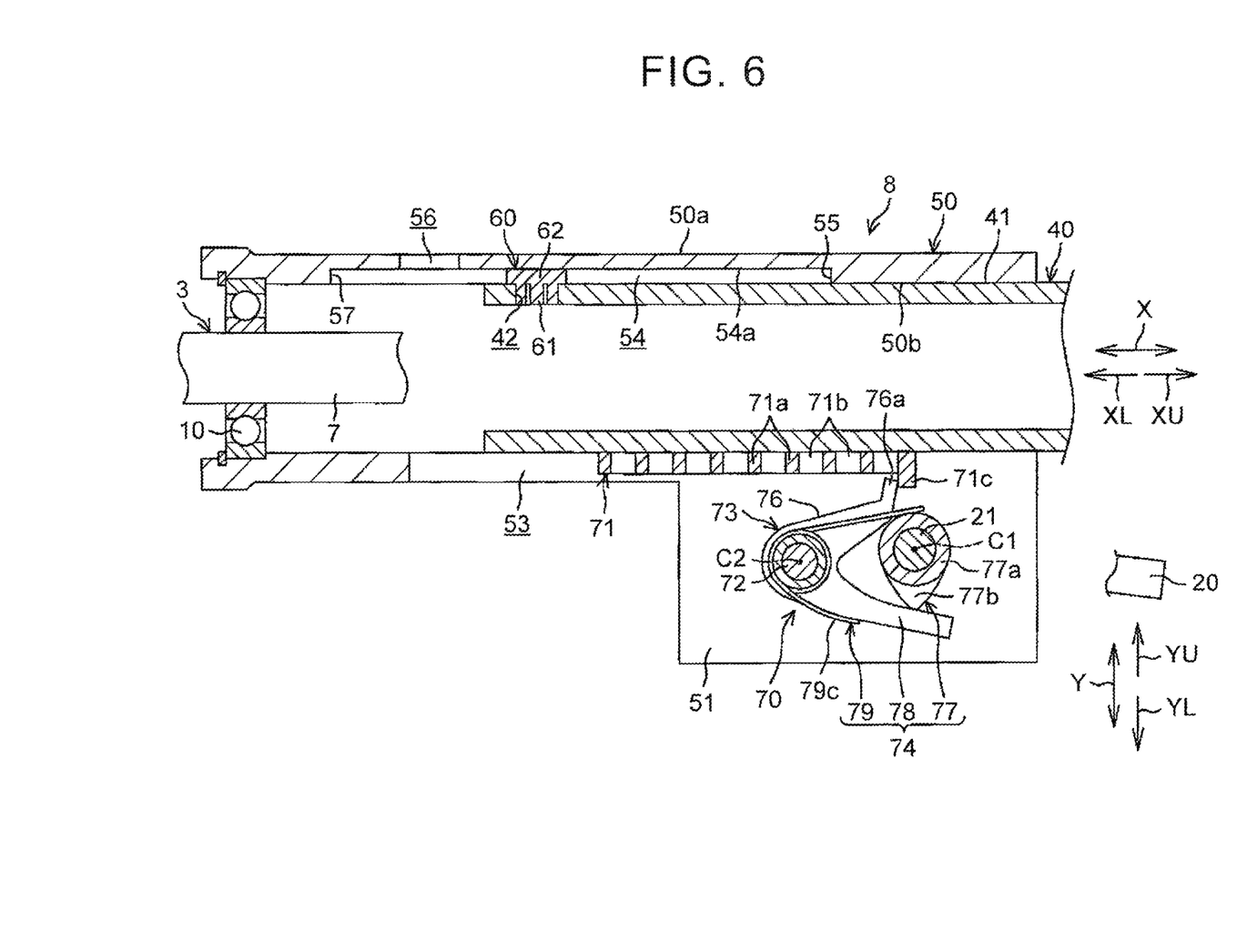
FIG. 6 is a sectional view of the main portion of the steering apparatus in the first embodiment as viewed from another angle, FIG. 6 illustrating a first most contracted state where the inner jacket is placed at the contraction-side end of the telescopic stroke range at the time of telescopic adjustment.

When the column jacket 8 is placed in a first most contracted state at the time of telescopic adjustment as illustrated in FIG. 6, the opening 56 is located on the axially lower side XL relative to the engaging member 60 (i.e., the opening 56 is located below the engaging member 60 in the axial direction X). Thus, at the time of telescopic adjustment, it is possible to suppress reduction of the rigidity of the outer jacket 50 due to the opening 56. Further, when the column jacket 8 is placed in a second most contracted state at the time of a secondary collision as illustrated in FIG. 8 (corresponding to the state where the engaging member 60 comes into contact with the bump stopper 57 provided at the lower end of the guide groove 54 in the axial direction X), the opening 56 is located on an axially upper side XU relative to the engaging member 60 (i.e., the opening 56 is located above the engaging member 60 in the axial direction X). Thus, at the time of a secondary collision, it is possible to suppress reduction of the rigidity of the outer jacket 50 due to the opening 56.

It is preferable that the opening 56 be provided in a portion of the outer jacket 50, the portion being on a tilt-direction upper side YU. In the event of a secondary collision, the axial upper end of the inner jacket 40 is lifted up toward the tilt-direction upper side YU, so that the axial lower end of the inner jacket 40 is pushed down toward a tilt-direction lower side YL. Thus, the engaging member 60 is less likely to be caught in the opening 56, so that impact absorption movement of the inner jacket 40 is smoothly carried out.

According to the first embodiment, because the guide groove 54 of the inner peripheral surface 50b of the outer jacket 50 has the bottom portion 54a, disconnection of the engaging member 60 from the inner jacket 40 is inhibited by the bottom portion 54a of the guide groove 54 (more specifically, the engaging member 60 is inhibited from falling out of the fixing hole 42 by the bottom portion 54a of the guide groove 54). Thus, by engaging the engaging member 60 with the extension-side stopper 55 at an end of the guide groove 54, it is possible to reliably prevent disconnection of the inner jacket 40 from the outer jacket 50.

Figure 9:
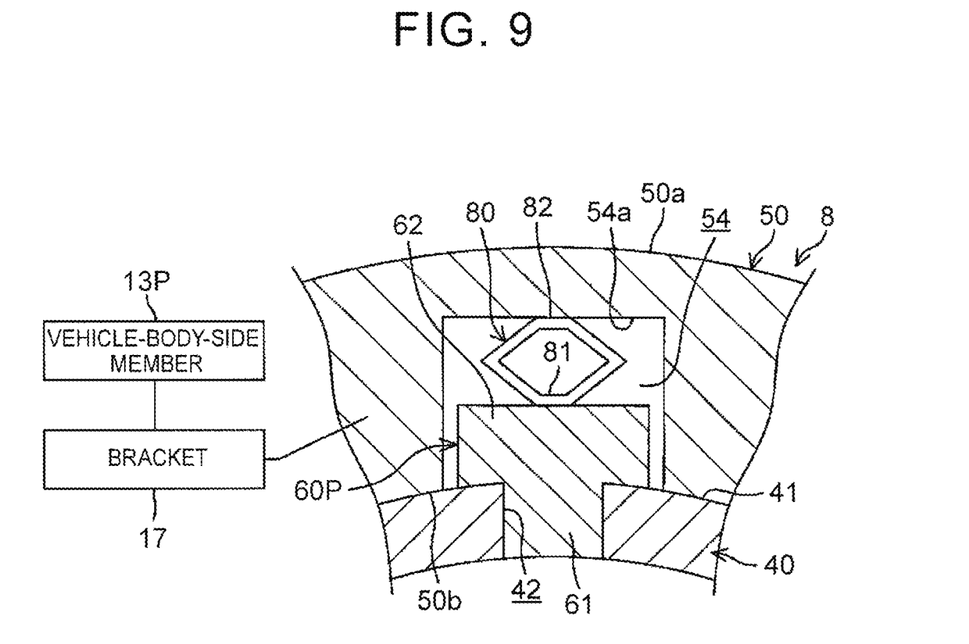
FIG. 9 is a sectional view of a main portion of a steering apparatus in a second embodiment of the present invention.

Further, because the guide groove 54 has the bottom portion 54a, the rigidity of the outer jacket 50 is higher than that when the guide groove is a through-groove (groove that passes through the outer jacket 50). Thus, it is possible to provide the steering apparatus 1 having high rigidity. Next, a second embodiment of the present invention will be described. FIG. 9 illustrates the second embodiment of the present invention. Referring to FIG. 9, the second embodiment is different from the first embodiment in the following points. An engaging member 60P is a conductive member such as a conductive metal member. Further, a conductive elastic member 80 that makes slide contact with the outer jacket 50 is provided so as to be integral with the engaging member 60P. This allows electric conduction between the inner jacket 40 and the outer jacket 50 via the engaging member 60P and the conductive elastic member 80.

The conductive elastic member 80 includes a connection portion 81 connected to the engaging member 60P such that electric conduction is allowed between the connection portion 81 and the engaging member 60P, and a contacting portion 82 that makes slide contact with the bottom portion 54a of the guide groove 54 such that electric conduction is allowed between the contacting portion 82 and the bottom portion 54a. The conductive elastic member 80 may constitute an elastic parallel link in the form of a pantograph as illustrated in FIG. 8. Further, the outer jacket 50 is connected to a vehicle-body-side member 13P via a bracket 17 such that electric conduction is allowed between the outer jacket 50 and the vehicle-body-side member 13P.

The elements in the second embodiment in FIG. 9 that are the same as those in the first embodiment in FIG. 3 are denoted by the same reference symbols as those for the elements in the first embodiment in FIG. 1. According to the second embodiment, electric conduction between the inner jacket 40 and the outer jacket 50 that is connected to the vehicle-body-side member 13P in an electrically-conductive manner is ensured via the conductive engaging member 60P and the conductive elastic member 80. This makes it possible to reduce the occurrence of radio noise. In particular, when grease or the like is disposed between the inner jacket 40 and the outer jacket 50, the structure of the present embodiment has the advantage of reducing the occurrence of radio noise.

The present invention is not limited to the foregoing embodiments. For example, the steering apparatus 1 is not limited to a manually-operated steering apparatus, and may be an electric power steering apparatus that assists steering by supplying power generated by an electric motor to a steering shaft 3. In addition, the foregoing embodiments of the present invention may be modified variously within the scope of appended claims.

What is claimed is:

1. A steering apparatus comprising:
a steering shaft to which a steering member is connected, the steering shaft being extendable in an axial direction;
a column jacket by which the steering shaft is rotatably supported, the column jacket being extendable in the axial direction, and the column jacket including an outer jacket and an inner jacket that are fitted to each other so as to be slidable relative to each other in the axial direction for telescopic adjustment; and
an engaging member having a base end fixed to the inner jacket, wherein:
an inner peripheral surface of the outer jacket includes
  a guide groove with which the engaging member is engaged, the guide groove extending in the axial direction, and the guide groove being configured to guide axial movement of the inner jacket via the engaging member while rotation of the inner jacket is restricted due to engagement of the engaging member with the guide groove, and
  a stopper provided at an end of the guide groove, the stopper being configured to restrict disconnection of the inner jacket from the outer jacket when being engaged with the engaging member; and
the guide groove has a bottom portion that faces a distal end of the engaging member.

2. The steering apparatus according to claim 1, wherein:
the outer jacket includes an opening through which the engaging member is allowed to be passed; and
when the column jacket is in a first most contracted state at a time of telescopic adjustment, the opening is located below the engaging member in the axial direction.

3. The steering apparatus according to claim 2, wherein:
when the column jacket is in a second most contracted state at a time of a secondary collision, the opening is located above the engaging member in the axial direction.

4. The steering apparatus according to claim 1, wherein:
the engaging member is a conductive member;
the engaging member is provided so as to be integral with a conductive elastic member that makes slide contact with the outer jacket;
the outer jacket is connected to a vehicle-body-side member such that electric conduction is allowed between the outer jacket and the vehicle-body-side member; and
electric conduction is allowed between the inner jacket and the outer jacket via the engaging member and the conductive elastic member.

* * * * *